United States Patent
Blumm et al.

(10) Patent No.: US 11,747,176 B2
(45) Date of Patent: Sep. 5, 2023

(54) MEASURING DEVICE COMPRISING VIBRATION DAMPER AND METHOD FOR SHIELDING A MEASURING DEVICE FROM VIBRATIONS

(71) Applicant: NETZSCH-Gerätebau GmbH, Selb (DE)

(72) Inventors: Jürgen Blumm, Selb (DE); Martin Brunner, Konradsreuth (DE); Reinhard Gschwendtner, Marktredwitz (DE); Georg Krist, Ihrlerstein (DE); Fabian Wohlfahrt, Rehau (DE)

(73) Assignee: NETZSCH-Gerätebau GmbH, Selb (DE)

( * ) Notice: Subject to any disclaimer, the term of this patent is extended or adjusted under 35 U.S.C. 154(b) by 0 days.

(21) Appl. No.: 17/454,493

(22) Filed: Nov. 11, 2021

(65) Prior Publication Data
US 2022/0170767 A1    Jun. 2, 2022

(30) Foreign Application Priority Data
Nov. 28, 2020   (DE) .................. 10 2020 007 279.8

(51) Int. Cl.
*G01D 11/24*   (2006.01)
*G01D 11/10*   (2006.01)

(52) U.S. Cl.
CPC ........... *G01D 11/10* (2013.01); *G01D 11/245* (2013.01)

(58) Field of Classification Search
CPC ................ G01D 11/10; G01D 11/245
See application file for complete search history.

(56) References Cited

U.S. PATENT DOCUMENTS

| | | | |
|---|---|---|---|
| 2,158,890 A | 5/1939 | Antelme | |
| 2005/0167188 A1* | 8/2005 | Aisenbrey | H05K 3/101 181/148 |
| 2018/0252739 A1* | 9/2018 | Malvern | G01P 1/003 |
| 2020/0149639 A1* | 5/2020 | Aikawa | F16K 7/17 |

FOREIGN PATENT DOCUMENTS

| | | | | |
|---|---|---|---|---|
| CN | 107783382 A | * | 3/2018 | ......... G03F 7/70716 |
| DE | 102004020605 A1 | | 11/2005 | |
| DE | 202017004177 U1 | | 11/2017 | |
| RU | 2124659 C1 | | 1/1999 | |

* cited by examiner

*Primary Examiner* — Jamel E Williams
(74) *Attorney, Agent, or Firm* — WHITMYER IP GROUP LLC

(57) ABSTRACT

A measuring device that includes a housing and at least one vibration damper attached to the housing.

7 Claims, 1 Drawing Sheet

MEASURING DEVICE COMPRISING VIBRATION DAMPER AND METHOD FOR SHIELDING A MEASURING DEVICE FROM VIBRATIONS

TECHNICAL FIELD

The invention relates to a measuring device comprising a vibration damper as well as a method for shielding a measuring device from vibrations.

BACKGROUND

Measuring devices are generally quite sensitive to environmental influences, in particular to vibrations, oscillations, or shocks. When setting up measuring devices, it would thus be desirable to be able to achieve an uncoupling of environmental influences on the measuring devices during the operation thereof.

Different approaches from the prior art deal with the absorption of oscillations for measuring systems: The publication RU 2124659 C1, for example, discloses damping devices for protection of measuring instruments and electronic devices, which are subjected to dynamic impacts. The publication DE 20 2017 004 177 U1 discloses magnetic damper bases for vibration-sensitive devices according to the principle of the magnetic pull. The publication DE 10 2004 020 605 A1 discloses oscillation dampers for reducing unwanted oscillations at machines. The publication U.S. Pat. No. 2,158,890 A discloses a shock-absorbing connector. The publication DE 20 2017 004 177 U1 discloses vibration-damping magnet absorbers for audio equipment.

SUMMARY

It is thus one of the objects of the invention to be able to better protect sensitive measuring devices from vibrations, oscillations, and other mechanically induced oscillations from the outside.

These and other objects are solved by means of a measuring device as well as by means of a method comprising the features of the claims.

According to a first aspect of the invention, a measuring device comprises a housing and a vibration damper attached to the housing.

A second aspect of the invention comprises a method for shielding a measuring device from vibrations with the steps of attaching one or several vibration dampers to a housing of a measuring device.

It is one of the essential ideas of the invention to use a vibration damper to reduce or completely dampen disruptive vibrations, which could be transmitted to a measuring device from the environment. The vibration damper can thereby have, for example, an oscillation damper, i.e. a mass-spring system with mechanical damping behavior. Excitations or transmissions of frequencies in certain frequency ranges can be avoided thereby by means of suitable implementation of the oscillating mass and/or the stiffness of the spring elements. Passive oscillation dampers, but also adaptive or active oscillation dampers can be used. In the case of the latter, damping properties of the spring elements can be changed according to a regulating signal by means of suitable actuators or regulators. A damping effect can thus be attained in a large operating range, for example by means of an optimization of the damping effect with respect to dynamically changing excitation frequencies.

For the vibration damping, active oscillation dampers can introduce systematic counter forces into a measuring device, for example via electromagnetic or electrodynamic actuators. With respect to amplitude, frequency and/or phase, these counter forces can be adjusted to the respective vibrations from the outside. Active oscillation dampers can thereby have in particular a corresponding vibration sensor system, with the help of which a power-electronic actuator technology can be regulated systematically.

Advantageous designs and further developments result from the further subclaims as well as from the description with reference to the figures.

According to some embodiments of the measuring device, the measuring device can have a thermal analysis device, a thermal conductivity tester, a rheometer, or fire test systems.

According to some embodiments of the measuring device, the vibration damper can be arranged in a device base of the housing.

According to some embodiments of the measuring device, the vibration damper can have a damping element receptacle and at least one damping element, which is received in the damping element receptacle.

According to some embodiments of the measuring device, the damping element can be a damping element, the damping properties of which can be actively adjusted. In some embodiments, the vibration damper can thereby furthermore have a control means, which is designed to adjust the damping properties of the damping element.

According to some embodiments of the measuring device, the measuring device can furthermore comprise a damping regulator, which is coupled to the control means of the vibration damper and which is designed to send a control signal to the control means, on the basis of which the control means adjusts the damping properties of the damping element.

According to some embodiments of the measuring device, the measuring device can furthermore comprise a device sensor, which is coupled to the damping regulator, and which is designed to determine characteristic operating conditions of the measuring device. In some embodiments, the damping regulator can thereby be designed to generate the control signal on the basis of the characteristic operating conditions of the measuring device, which are generated by means of the device sensor.

The above designs and further developments can be combined with one another arbitrarily, where sensible. Further possible designs, further developments, and implementations of the invention also comprise combinations, which are not mentioned explicitly, of features of the invention, which are described above or below with respect to the exemplary embodiments. The person of skill in the art will thereby in particular also add individual aspects as improvements or additions to the respective basic form of the present invention.

BRIEF DESCRIPTION OF THE DRAWINGS

The present invention will be described in more detail below on the basis of the exemplary embodiments specified in the schematic figures, in which.

Figure 1:
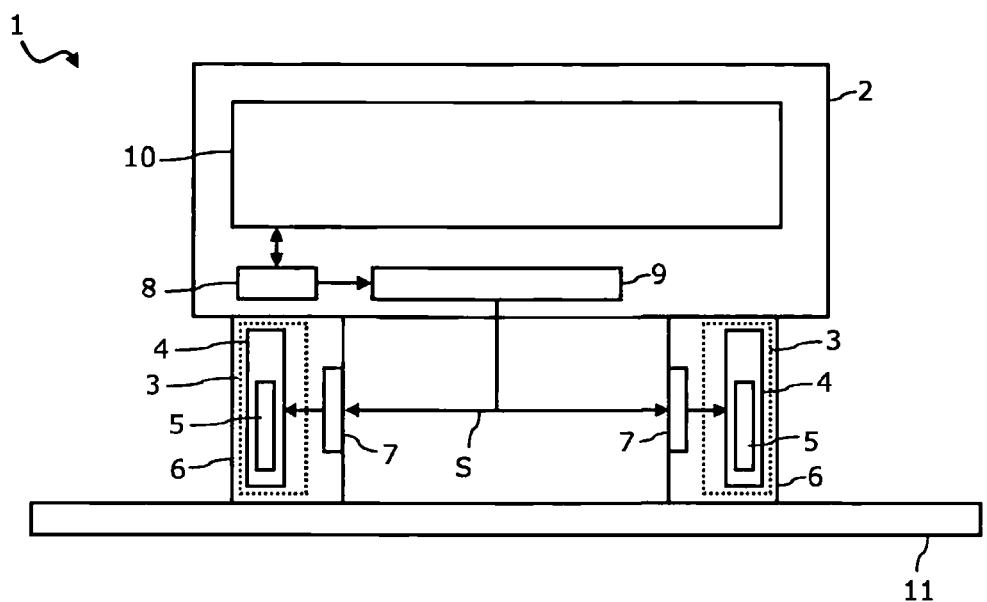
FIG. 1 shows a schematic block diagram of a measuring device comprising a vibration damper according to an embodiment of the invention.

The enclosed figures are to provide a greater understanding of the embodiments of the invention. They illustrate embodiments and, in connection with the description, they serve to describe the principles and concepts of the invention. Other embodiments and many of the mentioned advantages result with regard to the drawings. The elements of the drawings are not necessarily shown to scale with respect to one another. Directional terminology, such as, for instance, "top", "bottom", "left", "right", "above", "below", "horizontal", "vertical", "front", "rear", and similar information is only used for descriptive purposes and does not serve to limit the generality to specific designs as shown in the figures.

Elements, features, and components, which are identical, have identical functions and identical effects, are in each case provided with the same reference numerals, unless otherwise specified.

DETAILED DESCRIPTION

FIG. 1 shows a schematic block diagram of a measuring device 1, for example of a thermal analysis device, of a thermal conductivity tester, of a rheometer, or of a fire test system. Thermal analysis devices can comprise, for example, thermogravimetric devices, dynamic differential calorimetric devices, differential thermal analysis devices, or emission gas thermal analysis devices. The measuring device 1 generally comprises a housing 2, in which active measuring elements 10 of the measuring device 1 are accommodated. The active measuring elements 10 can have, for example, sample holders, heating elements, reference elements, measuring sensor systems, and other components, which are required for the respective functionality of the measuring device 1.

With the housing 2, the measuring device 1 can be placed on a surface, such as, for example, a table 11. For this purpose, the housing 2 can have one or several device bases 6, which are connected to the housing 2 and which have contact surfaces for a contact with the surface. Due to the physical contact between the device bases 6 and the surface, vibrations, oscillations, or other mechanical agitations can generally be transmitted to the housing 2 and thus the measuring device 1 via the surface. These vibrations, oscillations, or other mechanical agitations can have negative impacts on the measuring behavior of the measuring device 1 during the measuring operation, so that it is desirable to decrease the mechanical impairments as far as possible.

Vibrations, oscillations, and mechanical agitations, which can occur, are, for example, self-generated oscillations of the measuring device 1 or of its components, such as, for instance, the active measuring elements 10 or peripheral components, such as, for example, a transformer, a calculating means, or the like.

For this purpose, the measuring device 1 can have one or several vibration dampers 3, which are present between the housing 2 and the surface 11 as essentially sole physical connection. The vibration dampers 3 can be attached to the housing 2, in particular as firmly connected or integral parts of the housing 2 or of the base plate thereof, respectively, or also as extra assemblies, which can be screwed on, fixed, or reversibly released. For example, the one or several vibration dampers 3 can be arranged in one or several device bases 6 of the housing 2. In the example of FIG. 1, two device bases 6 each comprising a vibration damper 3 are shown for illustration purposes, but whereby it should be clear that any other number of vibration dampers 3 and/or device bases 6 is likewise possible. A reduction of self-generated oscillations as well as of external environmental influences can be attained by means of the vibration dampers 3, whereby an uncoupling can be realized, which is independent of the installation location. Due to the use of vibration dampers 3, a partial or provisional device calibration of the measuring device 10 can take place at any locations, and in particular at locations other than the intended operating location, so that a delivery calibration of the measuring device 1 can be performed prior to the delivery, and does not need to be readjusted or does not need to be readjusted significantly or has to be performed completely anew at the operating location, even due to a change of location. The use of vibration dampers 3 moreover allows for a use of the measuring device 1 outside of proper boundary use conditions, so that less restrictive requirements can be made on the specifications with respect to the operating location. In the case of measuring devices 1, in which samples have to be introduced or changed, respectively, in the active measuring elements 10, mechanical agitations caused unintentionally either by a human user of the measuring device 1 or also by an automatic sample changer, can be better compensated. This has an advantageous effect on the long service life of the sample holders, and measurements can potentially start more quickly, because an equilibration and conditioning phase can be shortened due to the use of the vibration dampers 3.

The device bases 6 can have, for example, an automatic level balancing control. For this purpose, the device bases 6 can each have, for example, a motor, which drives a height adjusting element, so as to be able to adjust the distance of the contact surface of the respective device base 6 and of the underside of the housing 2 at the position of the device base 6. The control of the automatic level balancing control can take place, for example, as a function of the measuring values of an inclination sensor in the measuring device 1.

When the vibration dampers 3 are installed in the device bases 6, the heat balance of the measuring device 1, in particular of thermal analysis devices, can be improved by the interruption of the heat flow from the housing 2 to the surface 11, and vice versa.

As shown in FIG. 1, each of the vibration dampers 3 can have, for example, a damping element receptacle 4 and at least one damping element 5, which is received in the damping element receptacle 4. The damping element 5 can consist, for example, of active or passive elements. The damping element 5 can moreover also have a combination of active and passive elements.

The damping element 5 can be, for example, actively adjustable in its damping properties. For this purpose, the vibration damper 3 can have a control means 7, which is also installed, for example, in the device base 6, or which is installed in the measuring device 1. The control means 7 serves the purpose of adjusting the damping properties of the damping element 5, for example in that the properties of the damping element 5, which influence the resilience of the damping element 5, are affected so as to have a regulatory effect.

The measuring device 1 can have, for example, a damping regulator 9, which is coupled to the control means 7 of the vibration damper 3. Characteristic operating conditions of the measuring device 1, for example weight asymmetries of the measuring device 1, weight distribution changes during the measuring operation, thermal changes of the components during the measurement, ambient temperature, prevailing air pressure, and the like, can be determined by a device sensor 8, which is coupled to the damping regulator 9. The device sensor 8 outputs or transmits, respectively, these characteristic operating conditions to the damping regulator 9, which can then output a control signal S, which is a function of the magnitude of the characteristic operating conditions.

The control signal S, in turn, is output to the control means 7 of the vibration dampers 3, which, in turn, can adjust the damping properties of the damping element 5 as a function of the control signal S. Each of the vibration dampers 3 can thereby be controlled via a separate control signal S. It can be possible, for example, to output different control signals S for different damping degrees of freedom, so as to be able to separately adjust or regulate, for example, damping properties in the plane of the surface 11 and/or along the longitudinal direction of the damping elements 5.

It can furthermore be possible to control the temperature of the vibration dampers 3, for example via heating elements coupled to the vibration dampers 3. A sensitivity of the vibration dampers 3 can thus be influenced by means of actively regulated heat output. For example, the heat output can be adjusted as a function of the temperature in the active measuring elements 10. In addition, the heat flow to the measuring device 1 or from the measuring device 1 to the surface 11, respectively, can be systematically influenced.

The damping elements 5 of the vibration damper 3 can be based on the most varied operating principles, for example hydraulic, pneumatic, mechanical, magnetic, or viscoelastic effects.

Figure 2:
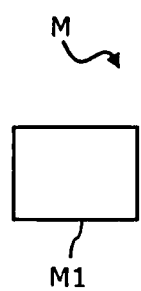
FIG. 2 shows a flowchart of a method for shielding a measuring device from vibrations according to a further embodiment of the invention.

FIG. 2 shows a flowchart of a method M for shielding a measuring device 1 from vibrations. The method M can be used, for example, for shielding the measuring device 1, as illustrated and described in connection with FIG. 1. In a step M1 of the method M, one or several vibration dampers 3 are attached to a housing 2 of a measuring device 1. The vibration dampers 3 can be attached to the housing 2, in particular as firmly connected or integral parts of the housing 2 or the base plate thereof, respectively, or also as extra assemblies, which can be screwed on, fixed, or reversibly released.

Different features for improving the stringency of the illustration have been summarized in one or several examples in the preceding detailed description. It should thereby be clear, however, that the above description is only of an illustrative, but in no way of a limiting nature. It serves to cover all alternatives, modifications, and equivalents of the different features and exemplary embodiments. Many other examples will be immediately and directly clear to the person of skill in the art on the basis of his expert knowledge in consideration of the above description.

The exemplary embodiments were selected and described in order to be able to illustrate the principles, on which the invention is based, and the application possibilities thereof in the best possible manner in practice. Experts can thus optimally modify and use the invention and the different exemplary embodiments thereof with regard to the intended purpose. The terms "including" and "having" are used as neutral linguistic terms for the corresponding terms "comprising" in the claims as well as the description. A use of the term "a" is to furthermore not generally rule out a plurality of features and components described in this way.

The invention claimed is:

1. A method for shielding a measuring device from vibrations, comprising:
   providing a plurality of damping element receptacles to an exterior of a housing of a thermal analysis device, a thermal conductivity tester, or a rheometer; and
   attaching a damping element to each of the damping element receptacles.

2. A measuring device, comprising:
   a housing;
   a plurality of vibration dampers, the vibration dampers each having a damping element receptacle attached to an exterior of the housing, and a plurality of damping elements received in the damping element receptables; and
   wherein the measuring device is a thermal analysis device, a thermal conductivity tester, or a rheometer.

3. The measuring device according to claim 2, wherein the vibration damper is arranged in a device base of the housing.

4. The measuring device according to claim 2, wherein the damping element is a damping element, the damping properties of which can be actively adjusted, and wherein the vibration damper furthermore has a control means, which is designed to adjust the damping properties of the damping element.

5. The measuring device according to claim 4, furthermore comprising a damping regulator, which is coupled to the control means of the vibration damper and which is designed to send a control signal to the control means, on the basis of which the control means adjusts the damping properties of the damping element.

6. The measuring device according to claim 5, furthermore comprising:
   a device sensor, which is coupled to the damping regulator and which is designed to determine characteristic operating conditions of the measuring device, wherein the damping regulator is designed to generate the control signal on the basis of the characteristic operating conditions of the measuring device, which are generated by means of the device sensor.

7. A measuring device, comprising:
   a housing;
   at least one vibration damper, the vibration damper having a damping element receptacle attached to an exterior of the housing, and at least one damping element received in the damping element receptable; and
   wherein the measuring device is a thermal analysis device, or a thermal conductivity tester.

* * * * *